(12) United States Patent
Bae et al.

(10) Patent No.: US 12,111,076 B2
(45) Date of Patent: Oct. 8, 2024

(54) AIR CLEANER

(71) Applicant: COWAY CO., LTD., Chungcheongnam-do (KR)

(72) Inventors: Jun-Hyoung Bae, Seoul (KR); Sung-Jae Lee, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 380 days.

(21) Appl. No.: 17/618,800

(22) PCT Filed: Jul. 1, 2020

(86) PCT No.: PCT/KR2020/008599
§ 371 (c)(1),
(2) Date: Dec. 13, 2021

(87) PCT Pub. No.: WO2021/002675
PCT Pub. Date: Jan. 7, 2021

(65) Prior Publication Data
US 2022/0235954 A1   Jul. 28, 2022

(30) Foreign Application Priority Data
Jul. 2, 2019   (KR) .......................... 10-2019-0079674

(51) Int. Cl.
*F24F 13/20* (2006.01)
*F24F 8/10* (2021.01)
(Continued)

(52) U.S. Cl.
CPC ................ *F24F 8/10* (2021.01); *F24F 13/20* (2013.01); *F24F 13/12* (2013.01); *F24F 2013/1446* (2013.01)

(58) Field of Classification Search
CPC .... F24F 8/10; F24F 8/80; F24F 1/0014; F24F 13/12
(Continued)

(56) References Cited

U.S. PATENT DOCUMENTS 11,079,119 B2 *   8/2021   Jeon ...................... F24F 1/0033
2015/0192323 A1   7/2015   Lee et al.

FOREIGN PATENT DOCUMENTS

CN   101676638 A   3/2010
CN   104764183 A   7/2015
(Continued)

OTHER PUBLICATIONS

International Search Report for International Application No. PCT/KR2020/008599, mailed Sep. 28, 2020, 11 pages.
Chinese Office Action for Counterpart Chinese Application No. CN 202080048514.8, mailed Mar. 16, 2023, 12 pages.

*Primary Examiner* — Allen R. B. Schult
(74) *Attorney, Agent, or Firm* — Guntin & Gust, PLC; Miyoung Shin

(57) ABSTRACT

Disclosed is an air cleaner comprising: a housing (H); an air-purifying filter (20); a blowing unit (30); and a channel switching member (200) for switching a discharge channel such that air supplied from the blowing unit (30) flows to at least one of a first discharge port (A51) to discharge air in a first direction and the second discharge port (A52) to discharge air in a second direction. The channel switching member (200) comprises: an elevating member (210) having a first communication unit (216) that is open such that air flows to a first discharge port-side channel (A3), and having a blocking unit (215) for blocking a flow thereof to a second discharge port-side channel (A4); and an opening/closing member (220). The first discharge port-side channel (A3) and the second discharge port-side channel (A4) are opened/
(Continued)

closed by ascending/descending of the elevating member (210) and moving of the opening/closing member (220).

14 Claims, 11 Drawing Sheets

(51) Int. Cl.
*F24F 13/12* (2006.01)
*F24F 13/14* (2006.01)

(58) Field of Classification Search
USPC .......................................................... 454/252
See application file for complete search history.

(56) References Cited

FOREIGN PATENT DOCUMENTS

| | | | |
|---|---|---|---|
| JP | H07035944 U | | 7/1995 |
| JP | 6251832 B1 | | 12/2017 |
| KR | 2010062121 A | * | 6/2010 |
| KR | 1020100062121 A | | 6/2010 |
| KR | 101158581 B1 | | 6/2012 |
| KR | 1020150082969 A | | 7/2015 |
| KR | 1020170066025 A | | 6/2017 |
| KR | 101916887 B1 | | 11/2018 |
| KR | 20190075721 A | | 7/2019 |
| NL | 2002265 C2 | | 1/2008 |

* cited by examiner

[Fig. 1]
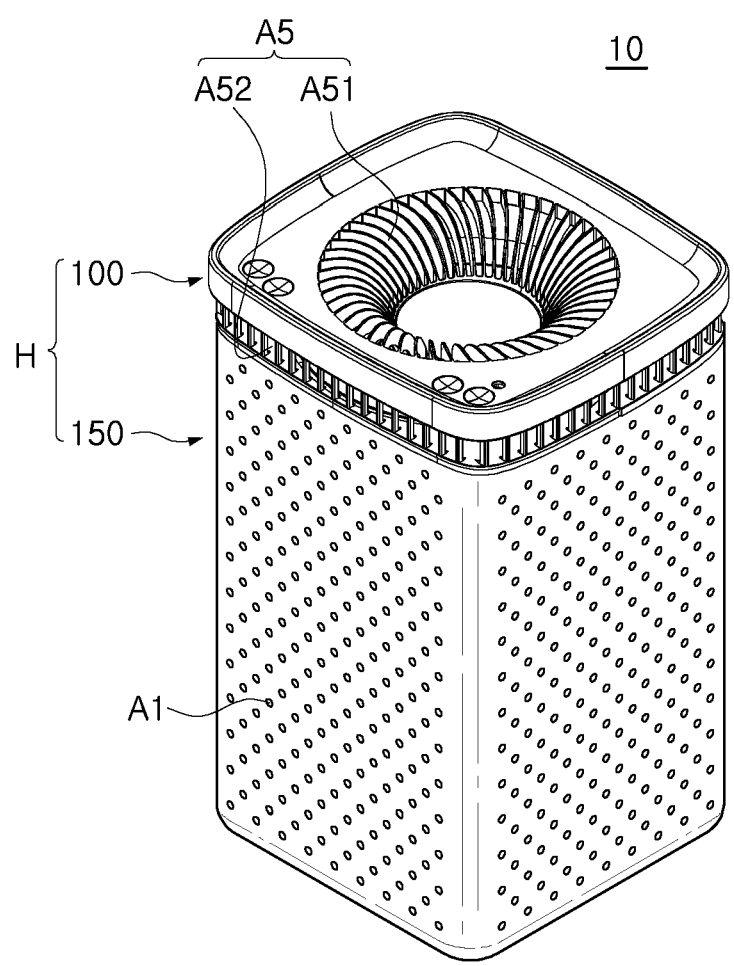

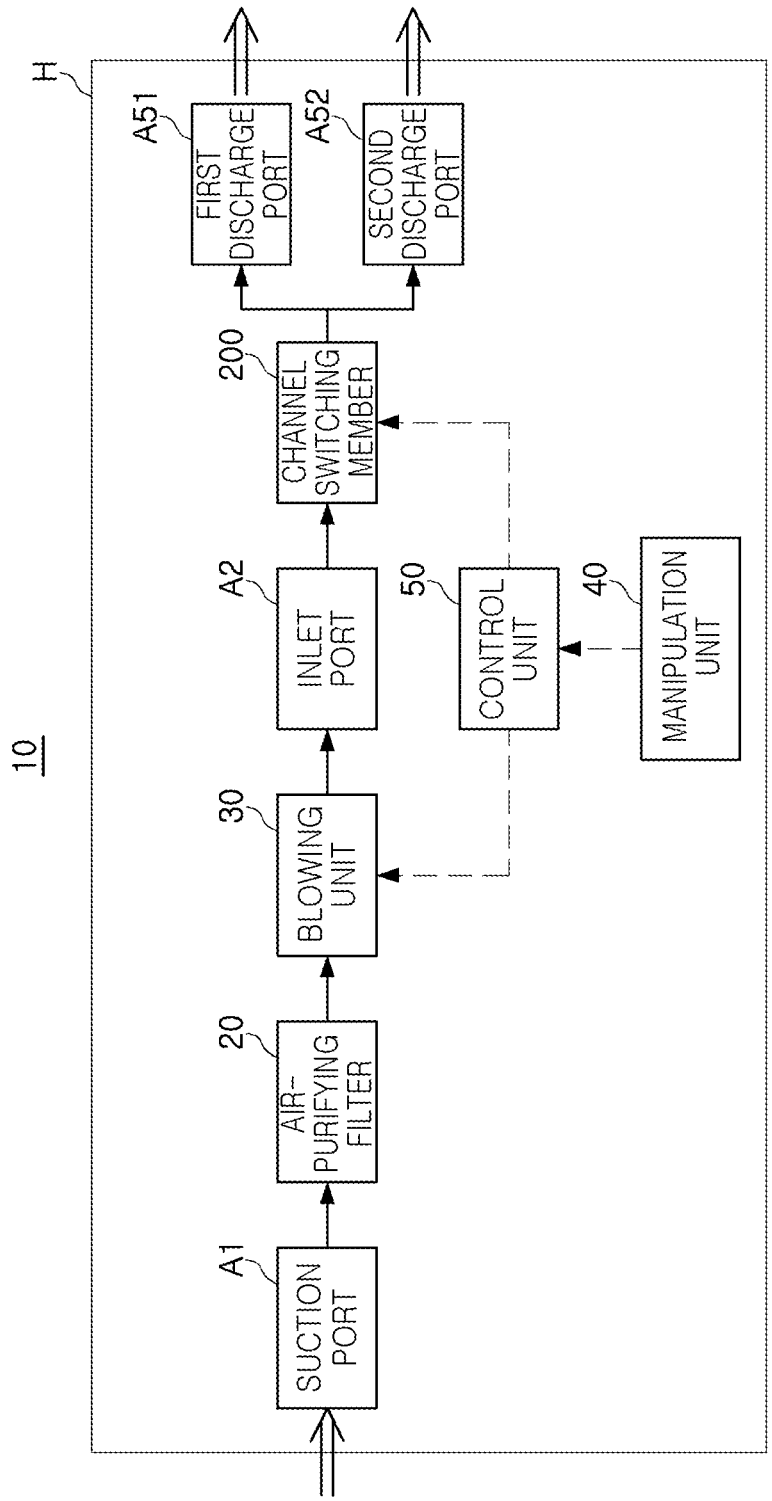
[Fig. 2]

[Fig. 3]
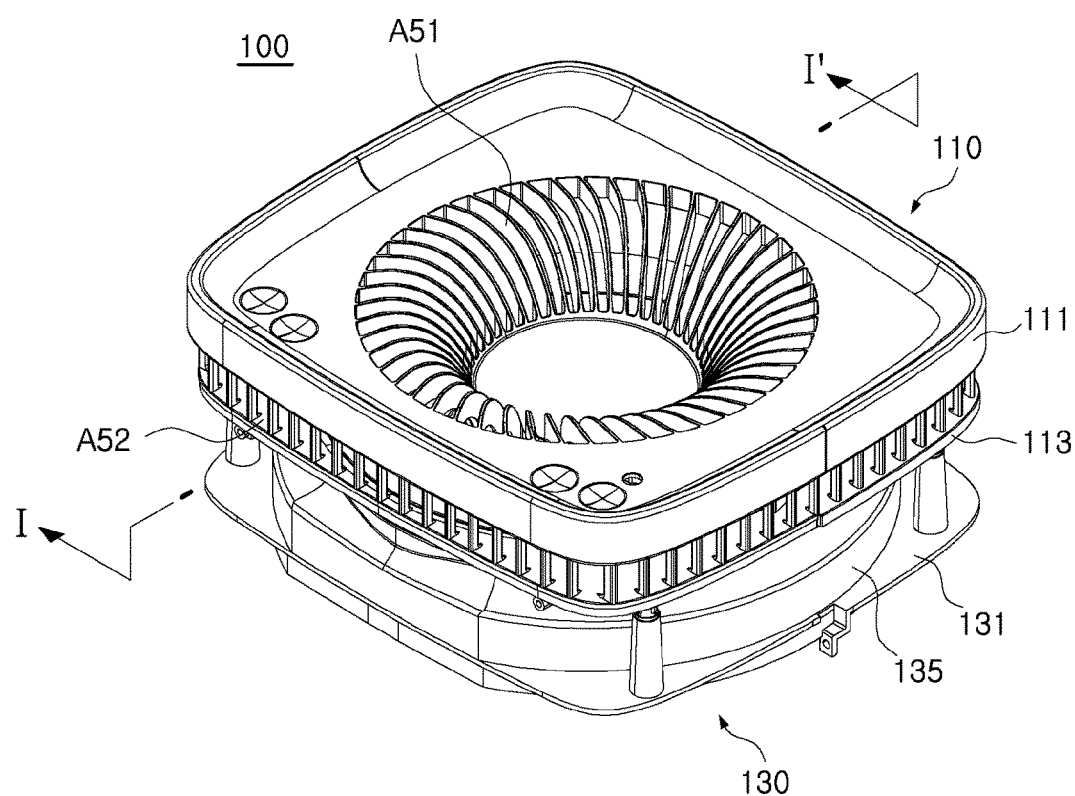

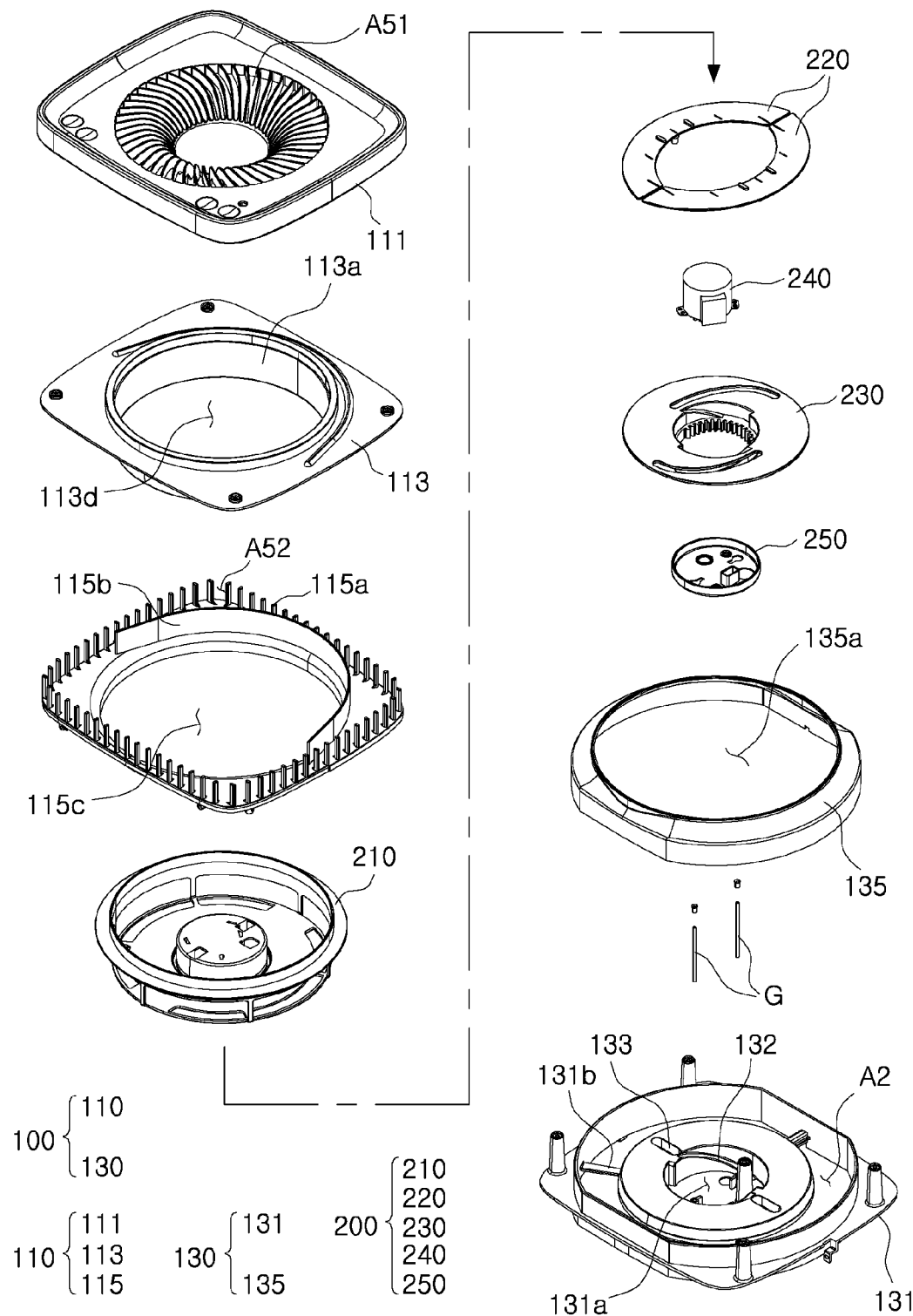
[Fig. 4]

[Fig. 5]
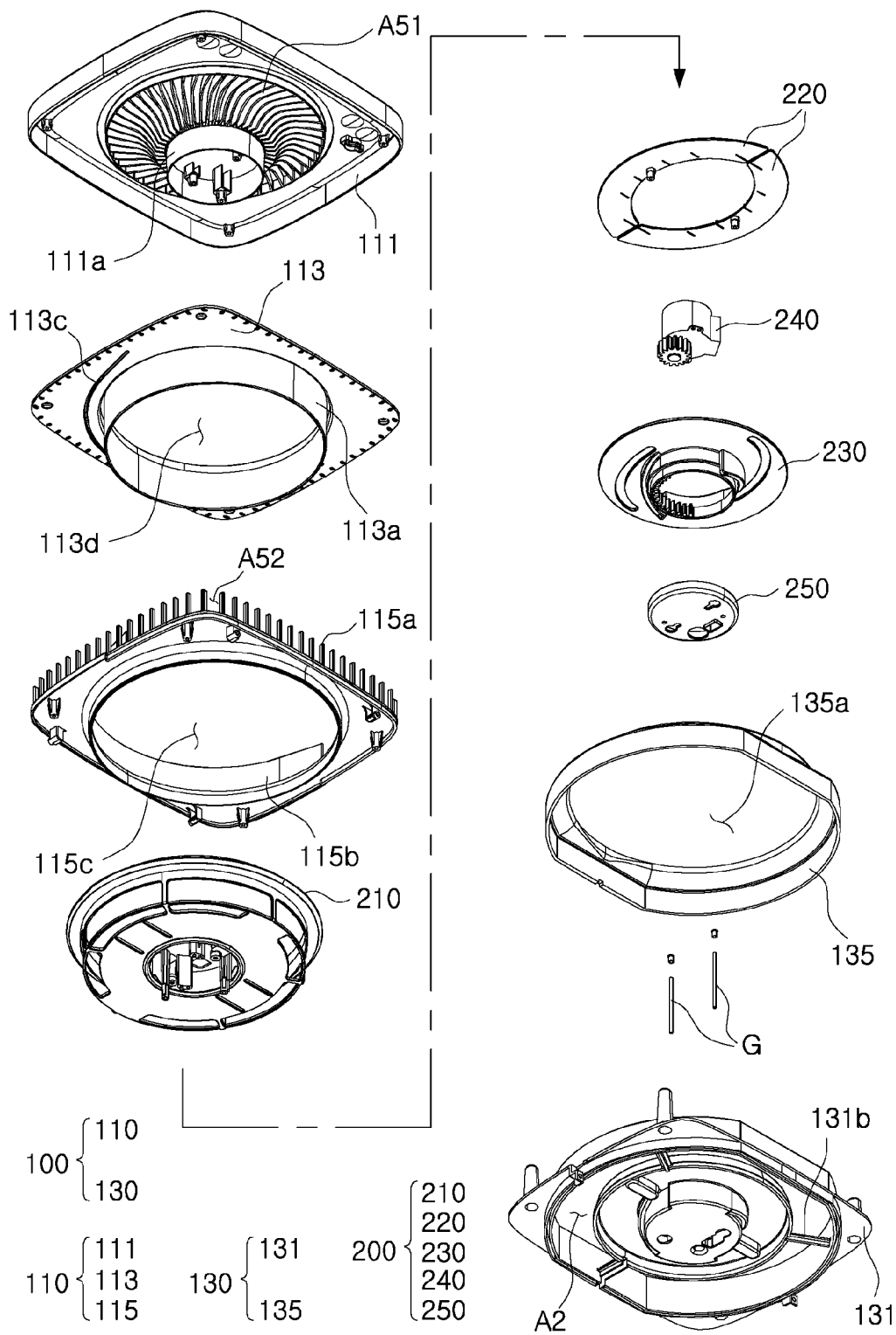

[Fig. 6]
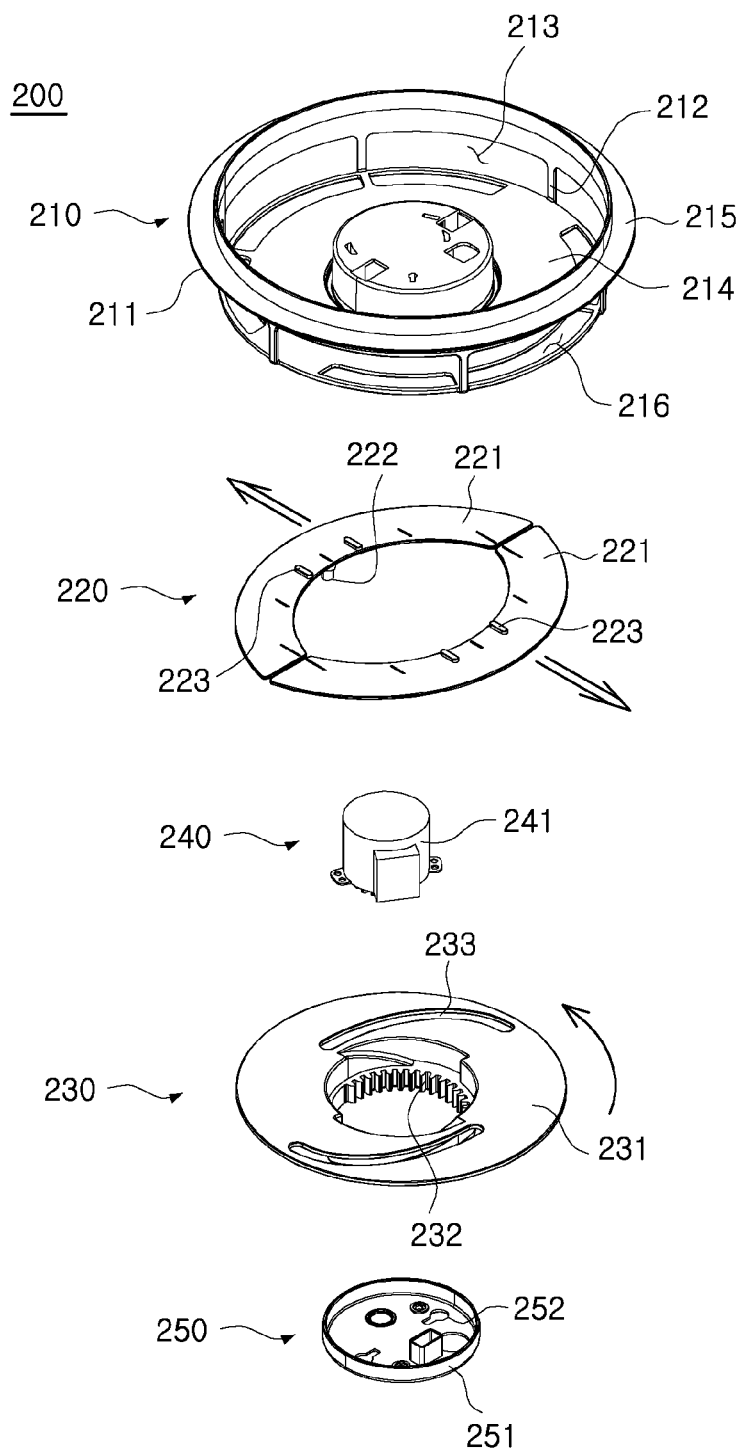

[Fig. 7]
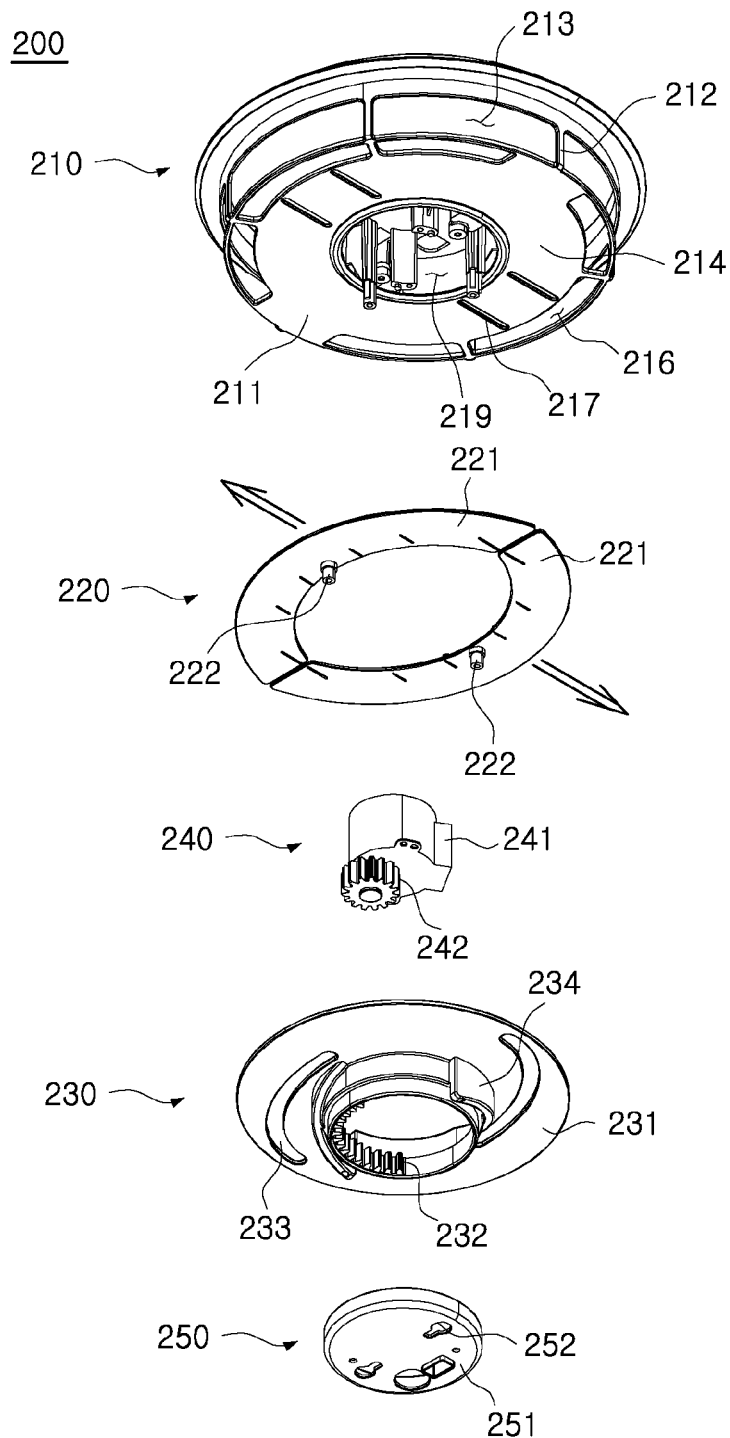

[Fig. 8]
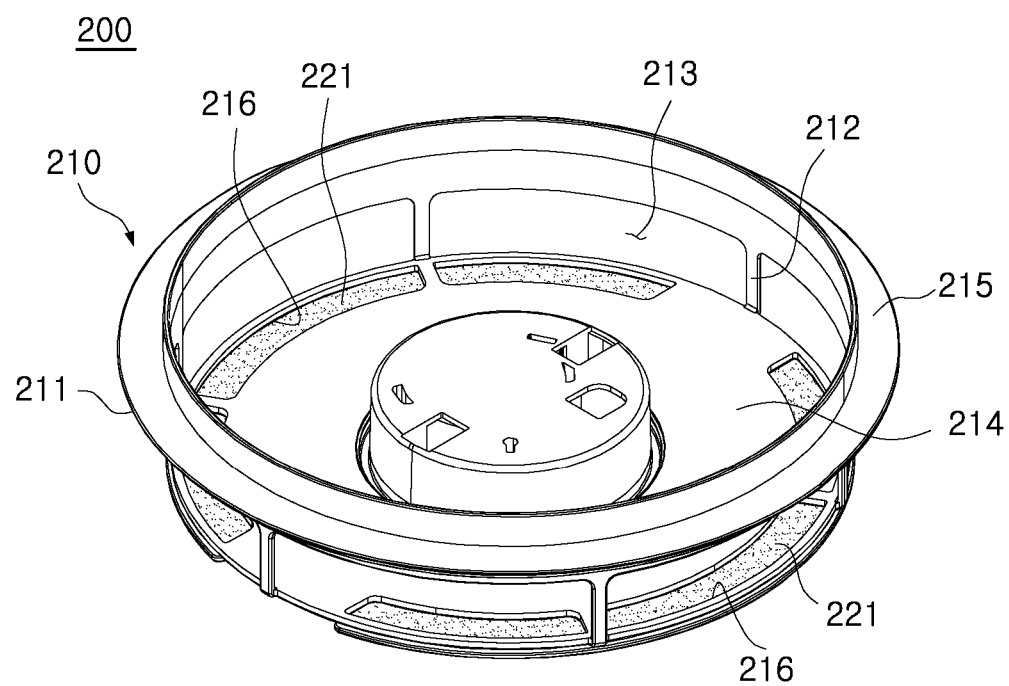

[Fig. 9]
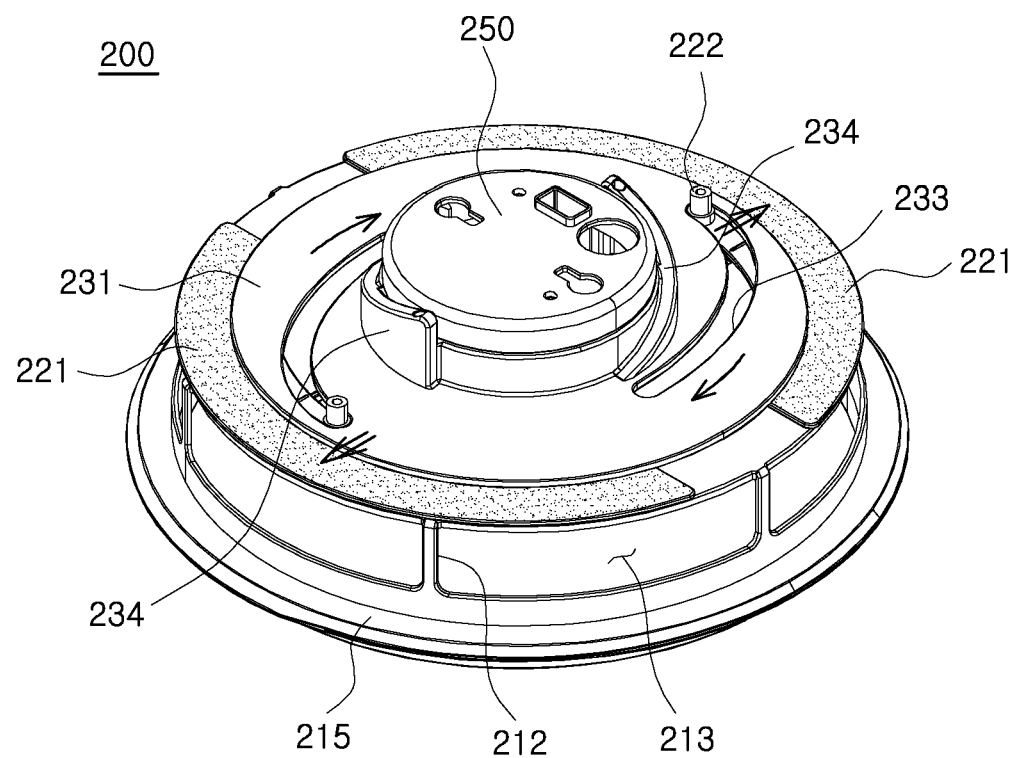

[Fig. 10]
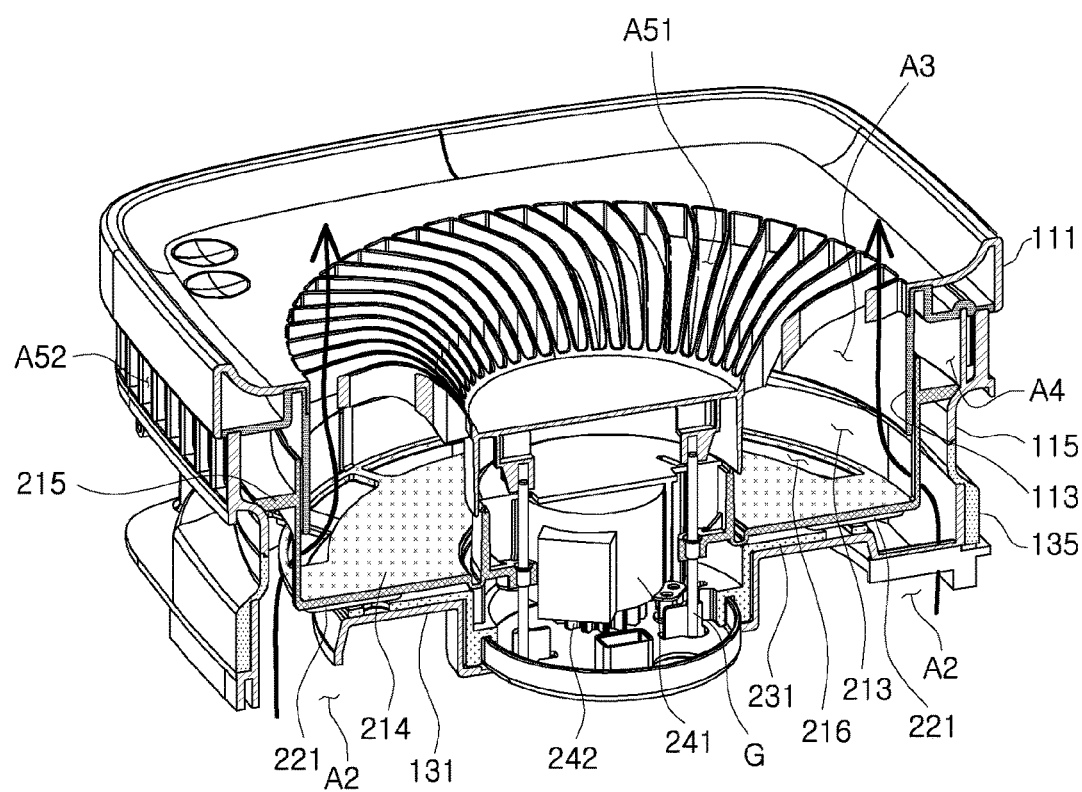

[Fig. 11]
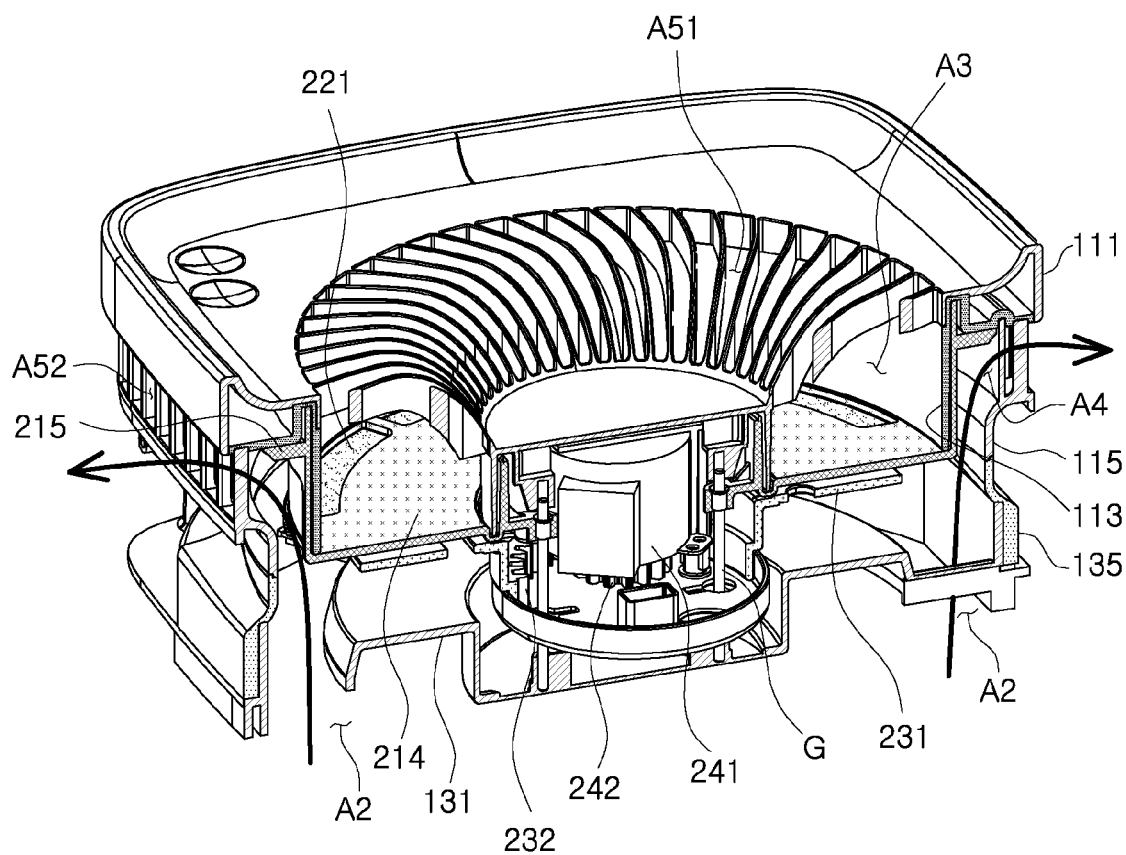

AIR CLEANER

TECHNICAL FIELD

The present disclosure relates to an air cleaner, and more particularly, an air cleaner which may selectively discharge purified air through a plurality of discharge ports.

BACKGROUND ART

An air cleaner is a device for purifying polluted air into fresh air, and may perform a function of removing dust and germs along with odors by allowing incoming air to pass through an air-purifying filter.

A general air cleaner may include a blowing fan (a blowing unit) for intaking air to be purified and an air-purifying filter for purifying air, and may be configured to discharge the purified air through a discharge port disposed on the front or upper surface of a housing.

Recently, an air cleaner including a discharge port installed on each of the front and upper surfaces of a housing, and selectively discharging air to a portion of the plurality of discharge ports has been suggested.

As an example, in Korean Patent Publication No. 2017-0066025 of the present applicant, an air cleaner in which a first discharge port and a second discharge port are installed in a housing, and a channel switching member for guiding air discharged by a blowing unit fan to at least one of the first discharge port and the second discharge port is provided has been suggested.

In air cleaner according to the above-mentioned Patent Publication No. 2017-0066025, a channel connecting the first or second discharge port in the blowing fan has a cross-sectional structure similar to a rectangular shape, and by partially opening and closing the channel having a rectangular cross-sectional structure by rotating the channel switching member about a horizontal shaft, an air flow to the first or second discharge port may be formed.

However, since the air cleaner has a structure in which the channel switching member opens and closes the channel having a rectangular cross-sectional structure, there may be many limitations in the shape of the discharge port connected to the channel switching member and the design of the housing.

Also, in the air cleaner, the channel switching member is configured to rotate over a range of approximately 180 degrees about a shaft disposed in the horizontal direction, and the distance between the discharge port and the channel switching member may be large, such that a substantial space may be used to install the channel switching member and the discharge port, which may be problematic.

An air cleaner is a device purifying polluted air into fresh air, and may perform a function of removing dust and germs along with odors by allowing incoming air to pass through an air-purifying filter.

A general air cleaner may include a blowing fan (a blowing unit) for intaking air to be purified and an air-purifying filter for purifying air, and may be configured to discharge the purified air through a discharge port disposed on the front or upper surface of a housing.

Recently, an air cleaner including a discharge port installed on each of the front and upper surfaces of a housing, and selectively discharging air to a portion of the plurality of discharge ports has been suggested.

As an example, in Korean Patent Publication No. 2017-0066025 of the present applicant, an air cleaner in which a first discharge port and a second discharge port are installed in a housing, and a channel switching member for guiding air discharged by a blowing unit fan to at least one of the first discharge port and the second discharge port is provided has been suggested.

In air cleaner according to the above-mentioned Patent Publication No. 2017-0066025, a channel connecting the first or second discharge port in the blowing fan has a cross-sectional structure similar to a rectangular shape, and by partially opening and closing the channel having a rectangular cross-sectional structure by rotating the channel switching member about a horizontal shaft, an air flow to the first or second discharge port may be formed.

However, since the air cleaner has a structure in which the channel switching member opens and closes the channel having a rectangular cross-sectional structure, there may be many limitations in the shape of the discharge port connected to the channel switching member and the design of the housing.

Also, in the air cleaner, the channel switching member is configured to rotate over a range of approximately 180 degrees about a shaft disposed in the horizontal direction, and the distance between the discharge port and the channel switching member may be large, such that a substantial space may be used to install the channel switching member and the discharge port, which may be problematic.

REFERENCE (Reference 1) KR2017-0066025 A (publicized on Jun. 14, 2017)

DISCLOSURE

Technical Problem

One aspect of the present disclosure is to provide an air cleaner which may reduce a space occupied by a discharge port and a channel switching member.

Also, one aspect of the present disclosure is to provide an air cleaner having a structure in which purified air may be selectively supplied to a first discharge port and a second discharge port through a channel switching member after passing through a ring-shaped air channel.

Further, one aspect of the present disclosure is to provide an air cleaner which may control the amount of air discharged to the first and second discharge ports instantly when purified air is discharged to the first and second discharge ports.

Also, one aspect of the present disclosure is to provide an air cleaner in which purified air may pass through a ring-shaped air channel, such that a shape of a discharge port and a design of a housing may be implemented differently from that of a general air cleaner.

Technical Solution

According to one aspect of the present disclosure, an air cleaner includes a housing having a suction port for intaking air, a first discharge port for discharging air in a first direction, and a second discharge port for discharging air in a second direction; an air-purifying filter provided in the housing and filtering air flowing in from the suction port; a blowing unit for providing blowing power such that air flowing in from the suction port flows to at least one of the first discharge port and the second discharge port; and a channel switching member for switching a discharge channel such that air supplied from the blowing unit to at least one of the first discharge port and the second discharge port, wherein the channel switching member includes an elevating member having a first communication unit opened to allow air supplied from the blowing unit to flow to a first discharge port-side channel, and a blocking unit for blocking air to flow to a second discharge port-side channel; and an opening/closing member moveably installed to open and close at least a portion of the first communication unit, wherein the first discharge port-side channel and the second discharge port-side channel are opened and closed as the elevating member moves up and down and the opening/closing member moves, wherein the housing includes a discharge port-side housing in which an inlet port through which air supplied from the blowing unit flows into, the first discharge port, and the second discharge port are formed, and wherein the discharge port-side housing includes a base member having the inlet port formed therein, and a cover member disposed on an upper side of the base member and including the first discharge port-side channel and the second discharge port-side channel formed therein.

The opening/closing member may open and close the first communication unit by sliding in a radial direction of the elevating member.

The channel switching member may include a driving member for providing driving force to allow the opening/closing member to slide; and a power transfer member for transferring driving force of the driving member to the opening/closing member, and the opening/closing member may slide in the radial direction of the elevating member as the power transfer member rotates by driving of the driving member.

The driving member may include a driving motor and a driving gear unit connected to the driving motor, and the power transfer member may include a body unit, a driven gear unit formed in the body unit and rotating in engagement with the driving gear unit, and an arc-shaped guide groove formed in the body unit to transfer rotational force of the driven gear unit to the opening/closing member.

A plurality of the opening/closing members may be provided, and the plurality of opening/closing member may slide to an inner side and an outer side in the radial direction of the elevating member according to rotation of the driven gear unit.

The opening/closing member may include a first protrusion guided by the arc-shaped guide groove and a second protrusion guided by a linear guide groove formed on a lower surface of the elevating member.

The opening/closing member may be disposed between the elevating member and the power transfer member, and may open and close the first communication unit by sliding on the lower side of the elevating member according to rotation of the power transfer member.

The inlet may have a ring shape, the first discharge port-side channel may be formed in the elevating member, and the second discharge port-side channel may be formed on the external side of the elevating member by surrounding the first discharge port-side channel.

The base member may include an inclined guide unit for guiding upward and downward movements of the channel switching member, and the power transfer member may include an inclined portion having an inclination so as to move up and down while being guided by the inclined guide unit as the body unit rotates.

Upward and downward movements of the channel switching member may be guided by an elevation guide member installed between the cover member and the base member.

The cover member may include a channel separation unit for partitioning the first discharge port-side channel and the second discharge port-side channel.

The base member may have a seating unit on which the channel switching member is seated in the center, and the inlet port may be formed in a ring shape around the seating unit.

According to another aspect of the present disclosure, an air cleaner includes a housing having a suction port for intaking air, a first discharge port for discharging air in a first direction, and a second discharge port for discharging air in a second direction; an air-purifying filter provided in the housing and filtering air flowing in from the suction port; a blowing unit for providing blowing power such that air flowing in from the suction port flows to at least one of the first discharge port and the second discharge port; and a channel switching member for switching a discharge channel such that air supplied from the blowing unit to at least one of the first discharge port and the second discharge port, wherein the channel switching member includes an elevating member having a first communication unit opened to allow air supplied from the blowing unit to flow to a first discharge port-side channel, and a blocking unit for blocking air to flow to a second discharge port-side channel; and an opening/closing member moveably installed to open and close at least a portion of the first communication unit, wherein the inlet port has a ring shape, wherein the first discharge port-side channel is formed in the elevating member, and the second discharge port-side channel is formed on the external side of the elevating member by surrounding the first discharge port-side channel, and the first discharge port-side channel and the second discharge port-side channel are opened and closed by upward and downward movements of the elevating member and movement of the opening/closing member.

Advantageous Effects

According to an embodiment of the present disclosure, an effect of reducing a space occupied by a discharge port and a channel switching member may be obtained.

Also, according to an embodiment of the present disclosure, an effect of selectively supplying purified air to a first discharge port and a second discharge port through a channel switching member after purified air passes through a ring-shaped air channel.

Further, according to an embodiment of the present disclosure, an effect of instantly adjusting the amount of purified air discharged to a first discharge port and a second discharge port when purified air is discharged to the first discharge port and a second discharge port.

Also, according to an embodiment of the present disclosure, by allowing purified air to pass through a ring-shaped air channel, a shape of a discharge port and a design of a housing may be implemented differently from that of a general air cleaner.

BRIEF DESCRIPTION OF DRAWINGS

FIG. 1 is a perspective diagram illustrating an air cleaner according to an embodiment of the present disclosure;

FIG. 2 is a schematic diagram illustrating a configuration of an air cleaner according to an embodiment of the present disclosure;

FIG. 3 is a perspective diagram illustrating an example in which a discharge port-side housing is separated from the air cleaner illustrated in FIG. 1;

FIG. 4 is an exploded perspective diagram illustrating a discharge port-side housing and a channel switching member accommodated therein, viewed from above;

FIG. 5 is an exploded perspective diagram illustrating a discharge port-side housing and a channel switching member accommodated therein, viewed from below;

FIG. 6 is an exploded perspective diagram illustrating a channel switching member illustrated in FIG. 4, viewed from above;

FIG. 7 is an exploded perspective diagram illustrating a channel switching member illustrated in FIG. 5, viewed from below;

FIG. 8 is a perspective diagram illustrating a state in which an opening/closing body is extended in the channel switching member illustrated in FIG. 6, viewed from above;

FIG. 9 is a perspective diagram illustrating the channel switching member illustrated in FIG. 8, viewed from below; and FIGS. 10 and 11 are cross-sectional perspective diagrams taken along line I-I' in FIG. 3, where FIG. 10 is a perspective cross-sectional diagram illustrating a state in which air is discharged to a first discharge port (an upper discharge port), and FIG. 11 is a perspective cross-sectional diagram illustrating a state in which air is discharged to a second discharge port (a front/side discharge port).

BEST MODE FOR INVENTION

Hereinafter, preferable embodiments of the present disclosure will be described with reference to the accompanying drawings. However, the embodiments of the present disclosure may be modified in various other forms, and the scope of the present disclosure is not limited to the embodiments described below. Also, the embodiments of the present disclosure are provided to describe the present disclosure more completely to a person having ordinary skill in the art. The shapes and sizes of the elements in the drawings may be exaggerated for clearer description.

Also, in the present specification, a singular term may include a plural form unless otherwise indicated, and the same reference numerals refer to the same element or a corresponding element throughout the embodiments.

In the description below, the embodiments of the present disclosure will be described with reference to the drawings.

FIG. 1 is a perspective diagram illustrating an air cleaner 10 according to an embodiment of the present disclosure. FIG. 2 is a schematic diagram illustrating a configuration of an air cleaner 10 according to an embodiment of the present disclosure. FIG. 3 is a perspective diagram illustrating an example in which a housing 100 on a discharge port-side is separated from the air cleaner 10 illustrated in FIG. 1. FIG. 4 is an exploded perspective diagram illustrating a housing 100 on a discharge port-side and a channel switching member 200 accommodated therein, viewed from above. FIG. 5 is an exploded perspective diagram illustrating a housing 100 on a discharge port-side and a channel switching member 200 accommodated therein, viewed from below.

Also, FIG. 6 is an exploded perspective diagram illustrating a channel switching member 200 illustrated in FIG. 4, viewed from above. FIG. 7 is an exploded perspective diagram illustrating a channel switching member 200 illustrated in FIG. 5, viewed from below. FIG. 8 is a perspective diagram illustrating a state in which an opening/closing body 221 is extended in the channel switching member 200 illustrated in FIG. 6, viewed from above. FIG. 9 is a perspective diagram illustrating a channel switching member 200 illustrated in FIG. 8, viewed from below. FIGS. 10 and 11 are cross-sectional perspective diagrams taken along line I-I' in FIG. 3, where FIG. 10 is a cross-sectional perspective diagram illustrating a state in which air is discharged to a first discharge port A51 (an upper discharge port), and FIG. 11 is a cross-sectional perspective diagram illustrating a state in which air is discharged to a second discharge port A52 (a front/side discharge port)

Referring to FIGS. 1 and 2, air cleaner 10 according to an embodiment of the present disclosure may include a housing H forming the exterior of the product, the air-purifying filter 20 for filtering and purifying air, a blowing unit 30 for providing blowing power, and a channel switching member 200 for switching a channel, and may further include a manipulation unit 40 manipulated by a user, and a control unit 50 for controlling air cleaner 10.

First, as illustrated in FIGS. 1 and 2, the housing H may form the exterior of air cleaner 10 product, and may include a suction port A1 for intaking external air, and a discharge port A5 for discharging air treated in the housing to the outside. A plurality of the discharge port A5 may be provided, and the discharge ports A5 may include a first discharge port A51 for discharging air in a first direction and a second discharge port A52 for discharging air in a second direction. For example, the first discharge port A51 may be formed on the upper surface of the housing H to discharge air toward the upper surface of the housing H, and the second discharge port A52 may be formed on at least one of the front, rear, left, right, and right sides of the housing H to discharge air in at least a portion of the directions of the front, rear, left, and right sides of the housing H. However, the shapes and installation positions of the first discharge port A51 and the second discharge port A52 are not limited to the examples illustrated in FIG. 1, and may be modified in consideration of the internal channel structure or required discharge performance.

As for the housing H, as illustrated in FIG. 1, a suction port-side housing 150 in which the suction port A1 is formed and a discharge port-side housing 100 in which the first discharge port A51 and the second discharge port A52 are formed may be separated manufactured and may be assembled for ease of manufacturing the housing body and assembly of the components.

Referring to FIG. 2, the air-purifying filter 20 may be provided in the housing H and may be configured to filter (purify) air flowing in from the suction port A1, and for example, the air-purifying filter 20 may be disposed in the air channel on a rear end of the suction port A1. Also, the air-purifying filter 20 may be installed on the front end of the blowing unit 30 such that air flowing in from the suction port A1 may be filtered by the air-purifying filter 20 and may flow into the blowing unit 30.

The air-purifying filter 20 may be configured to correspond to the shape and cross-sectional area of the air channel on the rear end of the suction port A1. For example, when the suction port A1 is formed throughout several surfaces of the housing H, the air-purifying filter 20 may be implemented as a three-dimensional filter having a circular or square cross-sectional surface and having a space therein. Also, the air-purifying filter 20 may be selected from among known filters having various shapes and functions, and the type of the filter, the number of the filter, and the shape of the filter may be varied depending on a required cleaning function and the shape of the channel.

Thereafter, the blowing unit 30 may provide blowing force such that air flowing in from the suction port A1 may flow to at least one of the first discharge port A51 and the second discharge port A52.

The blowing unit 30 may be configured to include a blowing fan and a fan motor similarly to a general air cleaner 10, and may further include a fan casing to supply air flowing in from the suction port A1 to the discharge port A5.

As an example, when the air-purifying filter 20 is implemented as a three-dimensional filter having a circular or square cross-sectional surface and having a space formed therein, a turbo fan or an axial flow fan may be used as the fan motor, but an example embodiment thereof is not limited thereto.

Air blown by the blowing unit 30 may be supplied to the channel switching member 200 through an inlet port A2 disposed on the lower side (the front end of the channel switching member on the air channel) of the channel switching member 200, and may be selectively discharged to at least one of the first discharge port A51 and the second discharge port A52 by the channel switching of the channel switching member 200.

Also, referring to FIG. 2, the control unit 50 may control the driving of the blowing unit 30 and the channel switching member 200 such that air from the blowing unit 30 may be discharged to at least one of the first discharge port A51 and the second discharge port A52. In the case, the channel switching member 200 may be configured to switch the channel such that air may be discharged through the first discharge port A51, may be discharged through the second discharge port A52, or may be discharged through both the first discharge port A51 and the second discharge port A52. The channel switching member 200 may be configured to adjust the ratio of air discharged through the first discharge port A51 and the second discharge port A52.

Which discharge port between the discharge ports A5 is to be used to discharge air may be automatically controlled by the control unit 50, or may be determined manipulating the manipulation unit 40 by a user.

Thereafter, the configuration of the discharge port-side housing 100 and the channel switching member 200 will be described with reference to FIGS. 3 to 11.

First, the discharge port-side housing 100 may be disposed above of the suction port-side housing 150 (in FIG. 1), and may include the inlet port A2 through which air supplied from the blowing unit 30 flows in, the first discharge port A51 and the second discharge port A52.

Referring to FIGS. 4, 5, 10 and 11, the discharge port-side housing 100 may include a base member 130 having an inlet port A2 formed, and a cover member 110 provided on the upper side of the base member 130. The cover member 110 may include a first discharge port-side channel A3 (in FIGS. 10 and 11) through which air from the inlet port A2 flows toward the first discharge port A51 side, and a second discharge port-side channel A4 (in FIGS. 10 and 11) through which air from the inlet port A2 flows toward the second discharge port A52 side.

The cover member 110 may include a channel separation unit 113 for partitioning the first discharge port-side channel A3 and the second discharge port-side channel A4, a side cover unit 115 disposed on the external side of the channel separation unit 113 and forming the second discharge port-side channel A4 between the cover member 110 and the channel separation unit 113, and an upper cover unit 111 disposed on the upper side of the channel separation unit 113 and the side cover unit 115 and having the first discharge port A51 formed therein. The cover member 110 illustrated in FIGS. 4 and 5 may be divided into the channel separation unit 113, the side cover unit 115, and the upper cover unit 111, but the divisional structure of the cover member 110 may be varied. For example, the cover member 110 may be divided into two or four or more members, or may be formed as an integrated structure.

Referring to FIGS. 3 to 5, 10 and 11, the upper cover unit 111 may include the first discharge port A51 penetrating the upper surface thereof, and a cover unit 111a may be installed in the center of the lower surface and may be configured to cover the portion in which the driving member 240 is installed.

The channel separation unit 113 may be disposed below the upper cover unit 111 and may partition the first discharge port-side channel A3 and the second discharge port-side channel A4 as illustrated in FIGS. 10 and 11. To the end, the channel separation unit 113 may include a sidewall unit 113a extending in the vertical direction. In the case, the first discharge port-side channel A3 may be formed in the sidewall unit 113a, and the second discharge port-side channel A4 may be formed in a ring shape around the outer periphery of the sidewall unit 113a.

The sidewall unit 113a may have a shape corresponding to that of the second communication unit 213 to close the second communication unit 213 formed on the side surface of an elevating member 210 described later.

Also, since an opening 113d is formed in the center of the channel separation unit 113, air passing through the first discharge port-side channel A3 may be discharged to the first discharge port A51.

A side cover unit 115 may be provided on the lower side the channel separation unit 113. The side cover unit 115 may be coupled to the channel separation unit 113, and the second discharge port A52 may be formed between the channel separation unit 113 and the side cover unit 115. In the case, a plurality of extension bars 115a spaced apart from each other may be provided between the channel separation unit 113 and the side cover unit 115. The second discharge port A52 may be configured as a spacing between the extension bars 115a. Although the extension bar 115a is formed in the side cover unit 115 in FIGS. 4 and 5, the extension bar 115a may be formed in the channel separation unit 113.

The opening 115c through which air flows may be formed in the center of the side cover unit 115, and the inner circumferential surface surrounding the opening 115c may correspond to the side surface of the air channel formed in the housing H. Referring to FIGS. 10 and 11, the second discharge port-side channel A4 may be formed between the inner circumferential surface surrounding the opening 115c of the side cover unit 115 and the sidewall unit 113a of the channel separation unit 113. Accordingly, when the air flow to the second discharge port A52 is blocked, the inner circumferential surface surrounding the opening 115c may be configured to be in contact with the blocking unit 215 of the elevating member 210 described later.

Also, the side cover unit 115 may include a discharge limitation unit 115b which may partially block the second discharge port A52 such that air may be discharged only through a portion of the front, rear, left, and right sides of the discharge port-side housing 100. For example, as illustrated in FIGS. 4 and 5, the discharge limitation unit 115b may be configured to block about half of the second discharge port A52, such that air may be discharged through a portion of the second discharge port A52 corresponding to a portion adjacent to the front surface among the front, left, and right side surfaces of the housing H. By the configuration of the discharge limitation unit 115b, air may be discharged intensively (with strong blowing force) to an area in which air has to be discharged. The discharge limitation unit 115b may be formed to protrude upwardly from the side cover unit 115, and the upper end of the discharge limitation unit 115b may be fitted into a mounting groove 113c formed in the lower surface of the channel separation unit 113.

Alternatively, when air is discharged through the entire front, rear, left, and right surfaces of the housing H, the above-described discharge limitation unit 115b may not be installed.

The base member 130 may include a base unit 131 and a side guide unit 135 installed above the base unit 131 and forming an air channel therein together with the side cover unit 115.

The base unit 131 may include, in the center thereof, a seating unit 131a on which the power transfer member 230 of the channel switching member 200 described later may be seated. A ring-shaped inlet port A2 may be formed around the seating unit 131a. To form the inlet port A2, the seating unit 131a may be connected to an outer body portion of the base unit 131 through a support bar 131b. The inlet port A2 may form a circular or prismatic ring shape. In FIGS. 4 and 5, the inlet port A2 may form a circular ring shape, but the shape of the inlet port A2 is not limited thereto and may have a prismatic (e.g., a polygon such as a quadrangle) ring shape.

As illustrated in FIGS. 10 and 11, the upper side of the side guide unit 135 may be coupled to the lower side of the side cover unit 115 to form an air channel therein, and the lower side of the side guide unit 135 may be coupled to the base unit 131.

Also, the opening 135a formed in the center of the side guide unit 135 may become a passage through which the channel switching member 200 may move up and down, and may also provide a path through which air flows.

In the description below, the channel switching member 200 will be described with reference to FIGS. 4 to 11.

The channel switching member 200 may be configured to switch the discharge channel such that air supplied from the blowing unit 30 may flow to at least one of the first discharge port A51 and the second discharge port A52. As illustrated in FIGS. 4 to 11, the channel switching member 200 may include an elevating member 210, an opening/closing member 220, a power transfer member 230 and a driving member 240, and a cap member 250 may be coupled to the lower side of the power transfer member 230. Also, the channel switching member 200 may be configured to move up and down in the housing H.

The elevating member 210 may include an elevating body 211, a first communication unit 216 opened such that air supplied from the blowing unit 30 through the inlet port A2 may flow to the first discharge port-side channel A3, and a blocking unit 215 for blocking a flow to the second discharge port-side channel A4. In the case, the first discharge port-side channel A3 may be formed in the elevating body 211, and the second discharge port-side channel A4 may be formed on the external side of the elevating body 211 by surrounding the first discharge port-side channel A3.

Also, the elevating member 210 may have a lower surface portion 214 formed on the lower surface of the elevating body 211, and the first communication unit 216 may penetrate the lower surface portion 214. As illustrated in FIGS. 6 and 7, the first communication unit 216 may be divided into a plurality of portions adjacent to the periphery of the lower surface portion 214 and may be configured to be opened and closed by the sliding of an opening/closing member 220 described later.

The blocking unit 215 of the elevating member 210 may be disposed in the space between the channel separation unit 113 and the side cover unit 115 such that air from the inlet port A2 may be prevented from flowing to the second discharge port-side channel A4. The blocking unit 215 may be formed to extend outwardly in a radial direction on the upper side of the elevating body 211.

The elevating member 210 may further include the second communication unit 213 penetrating the side portion of the elevating body 211 such that air supplied from the blowing unit 30 through the inlet port A2 may flow to the first discharge port-side channel A3, in addition to the first communication unit 216. The second communication unit 213 may include an opening formed through a plurality of connecting bars 212 on the side portion of the elevating body 211. Also, the second communication unit 213 may have a shape corresponding to that of the sidewall unit 113a of the channel separation unit 113. In the case, the second communication unit 213 may be closed when being in contact with the sidewall unit 113a of the channel separation unit 113.

Thereafter, the opening/closing member 220 may be movably installed to open and close at least a portion of the first communication unit 216. For example, the opening/closing member 220 may be configured to open and close the first communication unit 216 by sliding in the radial direction of the elevating member 210, that is, sliding to the inner side and the outer side in the radial direction. Also, the opening/closing member 220 may be installed between the lower side of the elevating member 210 and the upper side of the power transfer member 230 described later, as illustrated in FIGS. 4 to 11. However, the installation position is not limited to any particular position as long as the first communication unit 216 is able to be opened and closed. Also, although the embodiment in which the opening/closing member 220 closes the first communication unit 216 in the outer position (the extended position) in the radial direction is illustrated, but the position in which the first communication unit 216 may be modified such that the first communication unit 216 may be opened in the outer position (the extended position) in the radial direction.

The opening/closing member 220 may be divided into a plurality of portions to be able to slide to the inner side and the outer side in the radial direction of the elevating member 210, and may slide by the driving of the driving member 240 described later and may open and close the first communication unit 216.

The channel switching member 200 may include the driving member 240 and the power transfer member 230 for the movement of the opening/closing member 220 and/or the upward and downward movements of the elevating member 210.

The driving member 240 may be configured to include a driving motor 241 and a driving gear unit 242 connected to the driving motor 241, and may provide driving force for the movement and/or the elevating and lowering of the elevating member 210. The driving member 240 may be fixed to a motor mounting unit 219 formed on the lower surface of the elevating member 210 and may be configured to move up and down together with the elevating member 210.

Also, the power transfer member 230 may transmit the driving force of the driving member 240 to the opening/closing member 220, and may be disposed on the lower side of the opening/closing member 220.

The power transfer member 230 may include the body unit 231, a driven gear unit 232 rotating in engagement with the driving gear portion 242, and an arc-shaped guide groove 233 formed in the body unit 231 to transfer the rotational force of the driven gear unit 232 to the opening/closing member 220.

Also, the opening/closing member 220 may include an opening/closing body 221. A first protrusion 222 guided by the arc-shaped guide groove 233 may be formed on the lower surface of the opening/closing body 221. Also, a second protrusion 223 guided by a linear guide groove 217 formed on the lower surface of the elevating member 210 may be additionally formed on the upper surface of the opening/closing body 221.

In the case, the number of the arc-shaped guide groove 233 may be formed to correspond to the plurality of opening/closing members 220, and the first protrusion 222 of the opening/closing member 220 may be inserted into the each of the arc-shaped guide grooves 233. Also, the first protrusion 222 may be guided in the linear direction by the lower guide groove 133 penetrating the arc-shaped guide groove 233 and formed on the upper surface of the base unit 131 of the base member 130.

Accordingly, when the driving gear unit 242 of the driving member 240 rotates, the driven gear unit 232 engaged with the driving gear unit 242 may rotate, and accordingly, the entire power transfer member 230 may move in one direction (the curved arrow in FIG. 9). Also, the first protrusion 222 of the opening/closing member 220 may be guided by the arc-shaped guide groove 233 according to the rotation of the power transfer member 230. In the case, the first protrusion 222 formed on the lower surface of the opening/closing member 220 may penetrate the arc-shaped guide groove 233 and the rotational movement thereof may be limited by the lower guide groove 133, and accordingly, the rotation of the second protrusion 223 formed on the lower surface of the opening/closing member 220 may be limited by the linear guide groove 217 formed on the lower surface of the elevating member 210. Accordingly, when the power transfer member 230 rotates, the first protrusion 222 of the opening/closing member 220 may be guided by the arc-shaped guide groove 233 having a shape of being further away from the center of the body unit 231, and the opening/closing member 220 may linearly move in the outward direction (the linear arrows in FIGS. 6 and 9) in the radial direction of the elevating member 210. Accordingly, as illustrated in FIGS. 8 and 9, the opening/closing body 221 of the opening/closing member 220 may close the first communication unit 216 of the elevating member 210. Also, when the driving gear unit 242 rotates in the opposite direction to the direction described above, the opening/closing member 220 may move in the inward direction in the radial direction of the elevating member 210, and accordingly, the first communication unit 216 may be in an opened state.

By configuring the arc shape of the arc-shaped guide groove 233 and the position of the first communication unit 216 in the radial direction, the degree of opening the first communication unit 216 according to the rotation angle of the driving gear unit 242 and whether to open or close the first communication unit 216 may be adjusted, and accordingly, the amount of air discharged through the first communication unit 216 may be adjusted.

Also, by installing the arc-shaped guide groove 233 and the first protrusion 222 to correspond to the plurality of opening/closing members 220, the plurality of opening/closing members 220 may be configured to simultaneously slide to the inner side and the outer side in the radial direction of the elevating member 210 according to the rotation of the driving gear unit 242 and the driven gear unit 232.

To allow the elevating member 210 to slide between the inner side and the outer side in the radial direction, the arc-shaped guide groove 233 may have an arc shape in which the distance between the arc-shaped guide groove 233 and the body unit 231 may be formed to be greater in the outer side portion than in the inner side portion of the body unit 231.

The cap member 250 may be coupled to the lower side of the power transfer member 230, and a guide hole 252 in which an elevation guide member G is installed by penetrating therethrough may be formed in the cap body 251 of the cap member 250.

The channel switching member 200 may be configured to move up and down in the housing H, that is, in the discharge-side housing 100 particularly.

Specifically, the channel switching member 200 may be installed and seated on the base unit 131 of the base member 130, and may be configured to move up and down according to the rotation of the power transfer member 230.

To the end, the base unit 131 of the base member 130 fixed to and installed in the discharge-side housing 100 may include an inclined guide unit 132 having an inclination to guide the upward and downward movements of the channel switching member 200. Also, the power transfer member 230 include an inclined portion 234 (in FIGS. 7 and 9) having an inclination and a shape corresponding to the inclined guide unit 132 so as to move up and down by being guided by the inclined guide unit 132.

When the driving gear unit 242 and the driven gear unit 232 engaged therewith rotate by the driving of the driving member 240, the body 231 and the inclined portion 234 of the power transfer member 230 may rotate. Accordingly, the inclined portion 234 may move in the vertical direction along the inclined guide unit 132 of the fixed base member 130.

To guide the upward and downward movements of the channel switching member 200, an elevation guide member G (in FIGS. 4, 5, 10, and 11) may be disposed between the cover member 110 and the base member 130. The elevation guide member G may penetrate a guide hole 252 of the cap member 250 and a through hole of the elevating member 21 and may be fixed to and installed in the cover member 110 and the base member 130.

As described above, when the driving gear unit 242 and the driven gear unit 232 engaged therewith rotate by the driving of the driving member 240, the body unit 231 of the power transfer member 230, the arc-shaped guide groove 233 and the inclined portion 234 may rotate. Accordingly, the opening/closing member 220 may rotate to the inner side and the outer side in the radial direction of the elevating member 210, and the inclined portion 234 of the power transfer member 230 may move up and down according to the inclined guide unit 132 of the base member 130, such that the elevating member 210 may move up and down.

As described above, the opening/closing of the first discharge port-side channel A3 and the second discharge port-side channel A4 may be made by the lifting of the elevating member 210 and the movement of the opening/closing member 220.

For example, when the driving member 240 is driven in the forward direction as illustrated in FIGS. 8, 9 and 11, the arc-shaped guide groove 233 and the inclined portion 234 of the power transfer member 230 may rotate in the forward direction. Accordingly, the opening/closing member 220 may be disposed in an outer position (the extended position) in the radial position of the elevating member 210, and the channel switching member 200 may move up and down such that the elevating member 210 may be disposed in the elevated position in FIG. 11. In the case, the opening/closing body 221 of the opening/closing member 220 may be in contact with the first communication unit 216 and may close the first communication unit 216, and accordingly, the inlet port A2 may not be communicated with the first discharge port-side channel A3 formed in the elevating member 210.

Also, as illustrated in FIG. 11, when the elevating member 210 is disposed in the elevated position, the blocking unit 215 may be spaced apart from the side cover unit 115, such that the space between the channel separation unit 113 and the side cover unit 115 may be opened. Accordingly, the second discharge port-side channel A4 may be opened, such that the discharging through the second discharge port A52 may be performed.

When the driving member 240 is driven in the reverse direction in the state in FIG. 11, the arc-shaped guide groove 233 of the power transfer member 230 and the inclined portion 234 may rotate in the reverse direction. Accordingly, the opening/closing member 220 may be disposed in the inner position (the reduced position) in the radial direction of the elevating member 210, and the channel switching member 200 may move down such that the elevating member 210 may be disposed in the lowered position in FIG. 10. In the case, the opening/closing member 220 may not be in contact with the first communication unit 216 such that the first communication unit 216 may be in an open state, and accordingly, the inlet port A2 may be communicated with the first discharge port-side channels A3 formed on the inner side of the elevating member 210 such that the discharging through the first discharge port A51 may be performed.

Also, as illustrated in FIG. 10, when the elevating member 210 is disposed in the lowered position, the blocking unit 215 may be configured to be in contact with the channel separation unit 113 and the side cover unit 115 and may close the space between the channel separation unit 113 and the side cover unit 115. Accordingly, the inlet port A2 may not be communicated with the second discharge port-side channel A4.

The elevating member 210 may further include the second communication unit 213 penetrating the side portion of the elevating body 211 such that air supplied from the blowing unit 30 through the inlet port A2 may flow to the first discharge port-side channel A3, in addition to the first communication unit 216. In the case, the first discharge port-side channel A3 may be configured to communicate with the first communication unit 216 and the second communication unit 213.

In the case, as illustrated in FIG. 11, the first communication unit 216 in the elevated position of the elevating member 210 and the extended position (the outer position in the radial direction) of the opening/closing member 220 may be in contact with the opening/closing body 221 of the opening/closing member 220 and may be closed, and also, the second communication unit 213 may be in contact with the channel separation unit 113 and may be closed. Accordingly, the communication between the inlet port A2 and the first discharge port-side channel A3 through the first communication unit 216 and the second communication unit 213 may not be performed in the elevated position of the elevating member 210. Also, in the elevated position of the elevating member 210, the blocking unit 215 may be spaced apart from the side cover unit 115, such that the space between the channel separation unit 113 and the side cover unit 115 may be opened, and accordingly, the second discharge port-side channel A4 may be opened, such that the discharging through the second discharge port A52 may be performed.

Differently from the above configuration, as illustrated in FIG. 10, in the lowered position of the elevating member 210, the first communication unit 216 may be opened as the first communication unit 216 is not in contact with the opening/closing body 221 of the opening/closing member 220, and also, the second communication unit 213 may be in an open state as the second communication unit 213 is not in contact with the channel separation unit 113. Accordingly, the inlet port A2 may be communicated with the first discharge port-side channel A3 through the first communication unit 216 and the second communication unit 213 such that the discharging through the first discharge port A51 may be performed. Also, when the elevating member 210 is disposed in the lowered position, the blocking unit 215 may be configured to be in contact with the channel separation unit 113 and the side cover unit 115, such that the space between the channel separation unit 113 and the side cover unit 115 may be closed. Accordingly, the inlet port A2 may not be communicated with the second discharge port-side channel A4.

In the above embodiment, the configuration in which the discharging through the first discharge port A51 may be performed in the lowered position of the elevating member 210 illustrated in FIG. 10, whereas the discharging through the second discharge port A52 may be limited, and the discharging through the first discharge port A51 may be limited in the elevated position of the elevating member 210 illustrated in FIG. 11, whereas the discharging through the second discharge port A52 may be performed has been described, but the elevating member 210 may be disposed in the intermediate position between the lowered position in FIG. 10 and the elevated position in FIG. 11.

In the case, the first discharge port-side channel A3 and the second discharge port-side channel A4 may be in a partially open state, such that the discharging through both the first discharge port A51 and the second discharge port A52 may be performed.

In the case, the position/shape of the arc-shaped guide groove 233, the inclination angles of the inclined guide unit 131 of the base member 130 and the inclined portion 234 of the power transfer member 220, the installation position and size of the first communication unit 216 and/or the second communication unit 213 may be adjusted. In the case, the elevated height of the elevating member 210 according to the driving angle of the driving member 240 and whether to open the first communication unit 216 and/or the second communication unit 213 and the opening degree thereof may be adjusted. Accordingly, the amount of air discharged through the first discharge port A51 and the amount of air discharged through the second discharge port A52 may be adjusted.

In the description below, an operation of the channel switching member 200 will be described with reference to FIGS. 10 and 11.

As illustrated in FIG. 10, when the elevating member 210 is in the lowered position, the first communicating portion 216 and the second communicating portion 213 of the elevating member 210 may be in an open state, such that the inlet port A2 and the first discharge port-side channel A3 communicate with each other. Accordingly, air from the inlet port A2 may be discharged to the first discharge port A51 through the first discharge port-side channel A3. For reference, the arrow on the left side in FIG. 10 indicates a state in which air from the inlet port A2 flows into the first discharge port-side channel A3 through the first communication unit 216 and is discharged through the first discharge port A51. Also, the arrow on the right side in FIG. 10 indicates a state in which air from the inlet port A2 flows into the first discharge port-side channel A3 through the second communication unit 213 and is discharged through the first discharge port A51.

In the lowered position of the elevating member 210 illustrated in FIG. 10, the limitation unit of the elevating member 210 may be in contact with the channel separation unit 113 and the side cover unit 115, such that the space between the channel separation unit 113 and the side cover unit 115 may be closed, and accordingly, the communication between the inlet port A2 and the second discharge port-side channel A4 may be blocked, such that the discharging through the second discharge port A52 may not be performed.

When the driving member 240 of the channel switching member 200 operates in the state in FIG. 10, the driving gear unit 242 and the driven gear unit 232 engaged therewith may rotate in the forward direction according to the forward rotation of the driving motor 241, and accordingly, the entire power transfer member 230 may rotate.

As for the opening/closing member 220, the first protrusion 222 formed on the lower surface may penetrate the arc-shaped guide groove 233 and may be guided in the linear direction by the lower guide groove 133 formed on the upper surface of the base unit 131 of the base member 130, such that the rotational movement thereof may be limited, and the second protrusion 223 formed on the upper surface may be guided in the linear direction by the linear guide groove 217 formed on the lower surface of the elevating member 210, such that the rotational movement thereof may be limited. The arc-shaped guide groove 223 may have a shape of being further away from the center of the body unit 231 according to the forward rotation of the power transfer member 230. Accordingly, as the arc-shaped guide groove 223 presses the first protrusion 223 by the rotation of the power transfer member 230, the plurality of opening/closing members 220 may simultaneously move to the outer side in the radial direction of the elevating member 210, such that, as illustrated in FIGS. 8, 9 and 11, the first communication unit 216 may be closed. In the state in FIG. 11, the discharging of air through the first discharge port A51 may be limited.

Also, when the drive motor 241 rotates in the forward direction in the state in FIG. 10, the body unit 231 and the inclined portion 234 of the power transfer member 230 may also rotate together, and accordingly, inclined portion 234 may move in the upward direction according to the inclined guide unit 132 of the base member 130, fixedly installed. In the case, in accordance with the upward movement of the power transfer member 230, the channel switching member 200 may also move in the upward direction according to the guidance of the elevation guide member G.

When the elevating member 210 moves up and is disposed in the elevated position illustrated in FIG. 11, the blocking unit 215 of the elevating member 210 may move to the upper side and may not be in contact with the side cover unit 115. Accordingly, the space between the channel separation unit 113 and the side cover unit 115 may be opened such that the inlet port A2 and the second discharge port-side channel A4 may be communicated with each other, and air from the inlet port A2 may be discharged to the second discharge port A52 via the second discharge port-side channel A4. Also, the second communication unit 213 of the elevating member 210 may move to the upper side and may be in contact with the sidewall unit 113a (in FIGS. 4 and 5) of the channel separation unit 113. Accordingly, the communication between the inlet port A2 and the first discharge port-side channel A3 through the first communicating portion 216 as well as the second communicating portion 213 may not be performed, and the discharging through the first discharge port A51 may not be performed.

When the driving motor 241 rotates in the reverse direction in the elevated position of the elevating member 210 illustrated in FIG. 11, the movement may be performed in the opposition direction to the example described above, and as illustrated in FIG. 10, the opening/closing member 220 may be disposed on the inner side in the radial direction of the elevating member 210, and the elevating member 210 may be disposed in the lowered position.

Alternatively, by adjusting the rotation angle of the driving motor 241, the elevating member 210 may be disposed in the intermediate position between the lowered position in FIG. 10 and the elevated position in FIG. 11.

As for the intermediate position, since the first communication unit 216 and/or the second communication unit 213 of the elevating member 210 is in a partially open (closed) state, the inlet port A2 and the first discharge port-side channel A3 may be partially communicated with each other. Also, since the limitation unit of the elevating member 210 is not in contact with the side cover unit 115, the inlet port A2 and the second discharge port-side channel A4 may be partially communicate with each other. Accordingly, the discharging through both the first discharge port A51 and the discharge through the second discharge port A52 may be performed.

Also, by adjusting the degree of opening of the first communicating portion 216 and/or the second communicating portion 213 of the elevating member 210, the air supplied to the first discharge port-side channel A3 and the second discharge port-side channel A4 may be adjusted. In this case, the amount of air discharged through the first discharge port A51 and the amount of air discharged through the second discharge port A52 may be adjusted.

While the embodiments have been illustrated and described above, it will be apparent to those skilled in the art that modifications and variations could be made without departing from the scope in the embodiment as defined by the appended claims.

DESCRIPTION OF REFERENCE NUMERAL

10 . . . AIR CLEANER, 20 . . . AIR-PURIFYING FILTER, 30 . . . BLOWING UNIT 40 . . . MANIPULATION UNIT, 50 . . . CONTROL UNIT, 100 . . . DISCHARGE PORT-SIDE HOUSING 110 . . . COVER MEMBER, 111 . . . UPPER COVER UNIT, 111A . . . COVER UNIT 113 . . . CHANNEL SEPARATION UNIT, 113A . . . SIDEWALL UNIT, 113C . . . MOUNTING GROOVE 113D . . . OPENING, 115 . . . SIDE COVER UNIT, 115A . . . EXTENSION BAR 115B . . . DISCHARGE LIMITATION UNIT, 115C . . . OPENING, 130 . . . BASE MEMBER 131 . . . BASE UNIT, 131A . . . SEATING UNIT, 131B . . . SUPPORT BAR 132 . . . INCLINED GUIDE UNIT, 133 . . . LOWER GUIDE GROOVE, 135 . . . SIDE GUIDE UNIT 135A . . . OPENING, 150 . . . SUCTION PORT-SIDE HOUSING, 200 . . . CHANNEL SWITCHING MEMBER 210 . . . ELEVATING MEMBER, 211 . . . ELEVATING BODY, 212 . . . CONNECTING BAR 213 . . . SECOND COMMUNICATION UNIT, 214 . . . LOWER SURFACE PORTION, 215 . . . BLOCKING UNIT 216 . . . FIRST COMMUNICATION UNIT, 217 . . . LINEAR GUIDE GROOVE, 219 . . . MOTOR MOUNTING UNIT 220 . . . OPENING/CLOSING MEMBER, 221 . . . OPENING/CLOSING BODY, 222 . . . FIRST PROTRUSION 223 . . . SECOND PROTRUSION,

230 . . . POWER TRANSFER MEMBER, 231 . . . BODY UNIT 232 . . . DRIVEN GEAR UNIT, 233 . . . ARC-SHAPED GUIDE GROOVE, 234 . . . INCLINED PORTION 240 . . . DRIVING MEMBER, 241 . . . DRIVING MOTOR, 242 . . . DRIVING GEAR UNIT 250 . . . CAP MEMBER, 251 . . . CAP BODY, 252 . . . GUIDE HOLE A1 . . . SUCTION PORT, A2 . . . INLET PORT, A3 . . . FIRST DISCHARGE PORT-SIDE CHANNEL A4 . . . SECOND DISCHARGE PORT-SIDE CHANNEL, A5 . . . DISCHARGE PORT A51 . . . FIRST DISCHARGE PORT (FRONT/SIDE DISCHARGE PORT) A52 . . . SECOND DISCHARGE PORT (UPPER DISCHARGE PORT) G . . . ELEVATION GUIDE MEMBER, H . . . HOUSING

The invention claimed is:

1. An air cleaner, comprising:
a housing having a suction port for intaking air, a first discharge port for discharging air in a first direction, and a second discharge port for discharging air in a second direction;
an air-purifying filter provided in the housing and filtering air flowing in from the suction port;
a blowing unit for providing blowing power such that air flowing in from the suction port flows to at least one of the first discharge port and the second discharge port; and
a channel switching member for switching a discharge channel such that air supplied from the blowing unit to at least one of the first discharge port and the second discharge port,
wherein the channel switching member includes:
an elevating member having a first communication unit opened to allow air supplied from the blowing unit to flow to a first discharge port-side channel, and a blocking unit for blocking air to flow to a second discharge port-side channel; and
an opening/closing member moveably installed to open and close at least a portion of the first communication unit, wherein the first discharge port-side channel and the second discharge port-side channel are opened and closed as the elevating member moves up and down and the opening/closing member moves, wherein the housing includes a discharge port-side housing in which an inlet port through which air supplied from the blowing unit flows into, the first discharge port, and the second discharge port are formed, and
wherein the discharge port-side housing includes a base member having the inlet port formed therein, and a cover member disposed on an upper side of the base member and including the first discharge port-side channel and the second discharge port-side channel formed therein;
wherein the opening/closing member opens and closes the first communication unit by sliding in a radial direction of the elevating member.

2. The air cleaner of claim 1, wherein the channel switching member includes a driving member for providing driving force to allow the opening/closing member to slide; and a power transfer member for transferring driving force of the driving member to the opening/closing member, and
wherein the opening/closing member slides in the radial direction of the elevating member as the power transfer member rotates by driving of the driving member.

3. The air cleaner of claim 2, wherein the driving member includes a driving motor and a driving gear unit connected to the driving motor, and
wherein the power transfer member includes a body unit, a driven gear unit formed in the body unit and rotating in engagement with the driving gear unit, and an arc-shaped guide groove formed in the body unit to transfer rotational force of the driven gear unit to the opening/closing member.

4. The air cleaner of claim 3, wherein a plurality of the opening/closing members are provided, and
wherein the plurality of opening/closing member slides to an inner side and an outer side in the radial direction of the elevating member according to rotation of the driven gear unit.

5. The air cleaner of claim 4, wherein a number of the arc-shaped guide grooves corresponds to the number of the plurality of opening/closing members, and
wherein the plurality of opening/closing members simultaneously slide to the inner side and the outer side in the radial direction of the elevating member according to rotation of the driven gear unit.

6. The air cleaner of claim 3, wherein the opening/closing member includes a first protrusion guided by the arc-shaped guide groove and a second protrusion guided by a linear guide groove formed on a lower surface of the elevating member.

7. The air cleaner of claim 1, wherein the first discharge port-side channel is formed in the elevating member, and
wherein the second discharge port-side channel is formed on an external side of the elevating member by surrounding the first discharge port-side channel.

8. The air cleaner of claim 3, wherein the base member includes an inclined guide unit for guiding upward and downward movements of the channel switching member, and wherein the power transfer member includes an inclined portion having an inclination so as to move up and down while being guided by the inclined guide unit as the body unit rotates.

9. The air cleaner of claim 8, wherein the opening/closing member has a first protrusion guided by the arc-shaped guide groove, and
wherein the base member includes a lower guide groove for guiding linear movement of the first protrusion.

10. The air cleaner of claim 1, wherein upward and downward movements of the channel switching member are by an elevation guide member installed between the cover member and the base member.

11. The air cleaner of claim 1, wherein the cover member includes a channel separation unit for partitioning the first discharge port-side channel and the second discharge port-side channel.

12. The air cleaner of claim 11, wherein the cover member further includes a side cover unit disposed on an external side of the channel separation unit and forming the second discharge port-side channel between the cover member and the channel separation unit, and
wherein, to prevent the inlet port and the second discharge port-side channel from being communicated with each other, the blocking unit of the elevating member closes a space between the channel separation unit and the side cover unit.

13. The air cleaner of claim 12, wherein the elevating member includes the first communication unit formed on a lower surface portion, and a second communication unit formed on a side portion, and
wherein to prevent the inlet port and the first discharge port-side channel from being communicated with each other in an elevated position of the elevating member, the first communication unit is closed by being in contact with the opening/closing member, and the second communication unit is closed by being in contact with the channel separation unit.

14. The air cleaner of claim 12, wherein the cover member further includes an upper cover unit disposed on upper sides of the channel separation unit and the side cover unit and including the first discharge port formed therein.

* * * * *